United States Patent [19]
Schur

[11] 3,715,885
[45] Feb. 13, 1973

[54] HEAT VAPOR DIFFERENTIAL ENGINE

[76] Inventor: George O. Schur, 3775 S.W. 108th Avenue, Miama, Fla. 33165

[22] Filed: Nov. 12, 1971

[21] Appl. No.: 198,161

[52] U.S. Cl. ............................. 60/25, 60/26, 60/36
[51] Int. Cl. .......... F01k 25/10, F03g 7/02, F03g 7/00
[58] Field of Search ........................... 60/25, 26, 36, 1

[56] References Cited

UNITED STATES PATENTS 2,976,675   3/1961   Bonner ................................. 60/25

Primary Examiner—Martin P. Schwadron
Assistant Examiner—Allen M. Ostrager
Attorney—Hyman Berman et al.

[57] ABSTRACT

A heat engine consisting of a hermetically vapor vacuum sealed container and a heat-transfer fluid circuit, the fluid circuit including a heat source such as a solar heat collector. The engine employs as a working fluid a liquid with a low boiling point in the container, the heat transfer circuit passing through the lower portion of the container so that heat is conducted therefrom to the working fluid, causing bubbles to be generated therein. The bubbles flow upwardly and drive a turbine assembly mounted in the upper portion of the container. The turbine assembly is magnetically coupled to an external load device. The top of the container consists of a condenser exposed to ambient temperature wherein the bubbles are condensed and returned to a liquid state.

12 Claims, 9 Drawing Figures

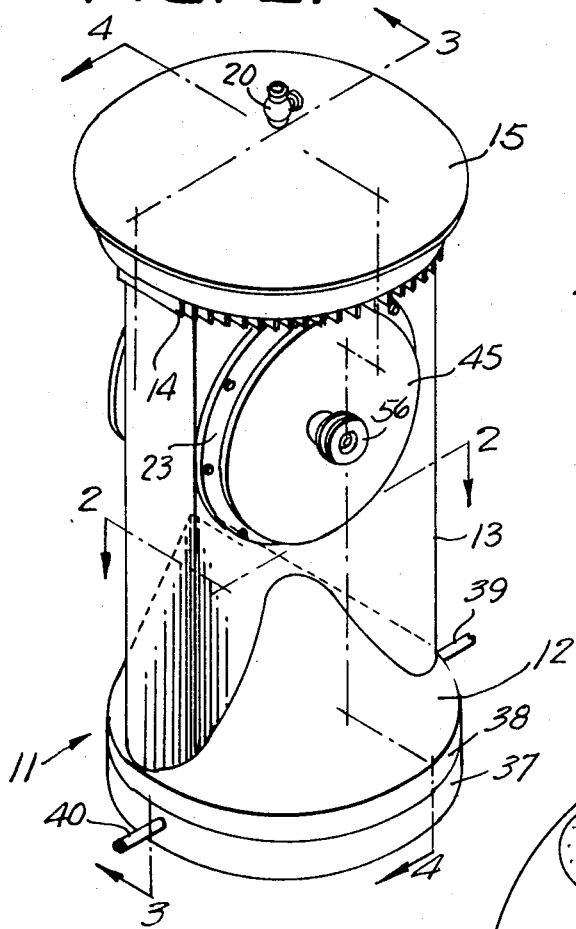
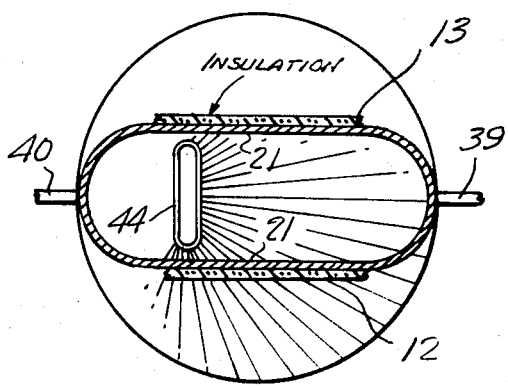
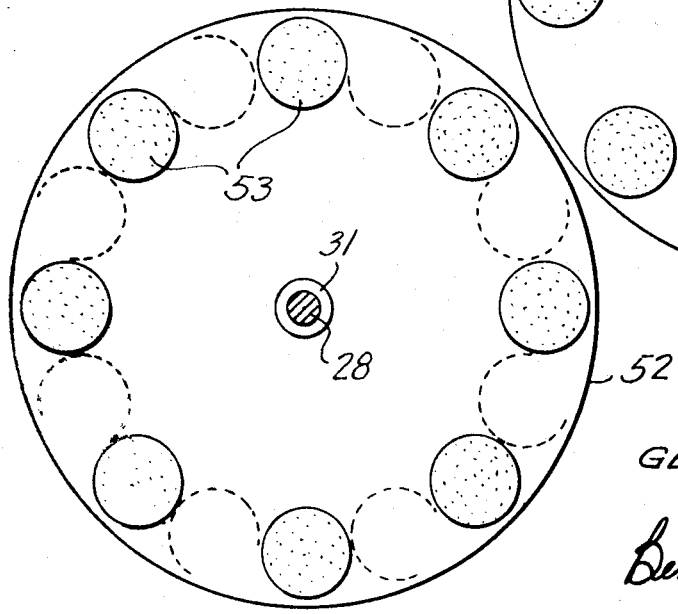

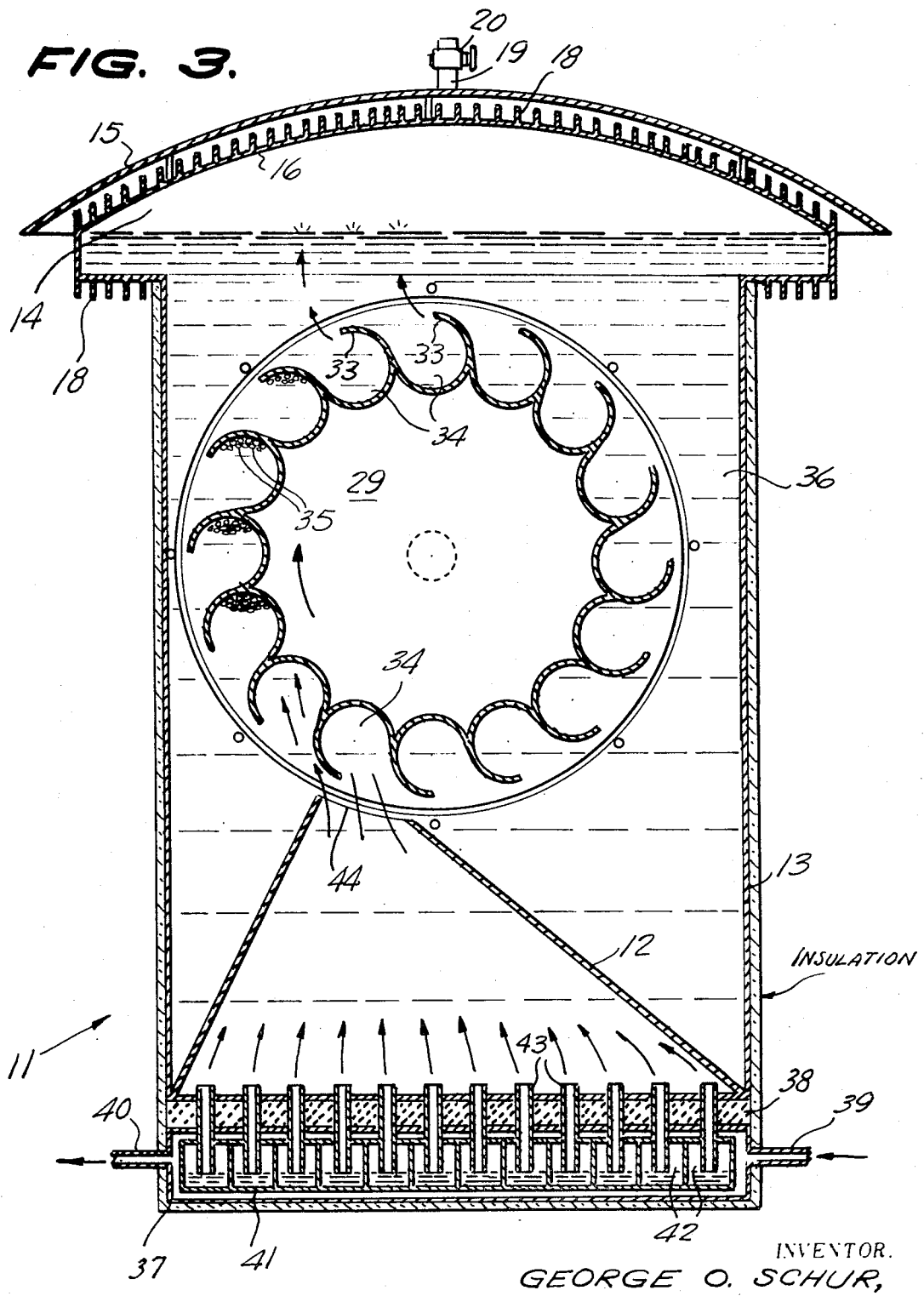

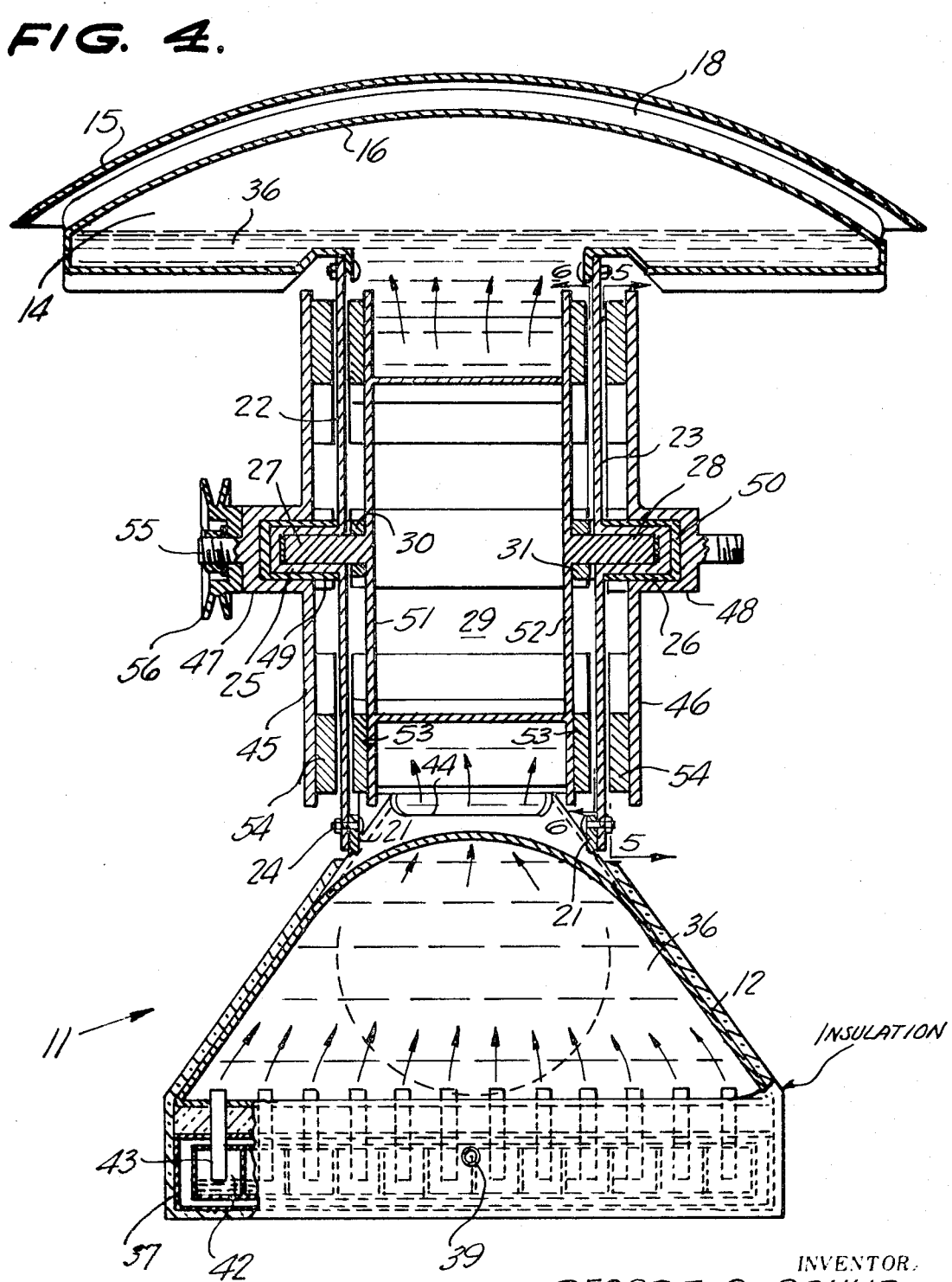

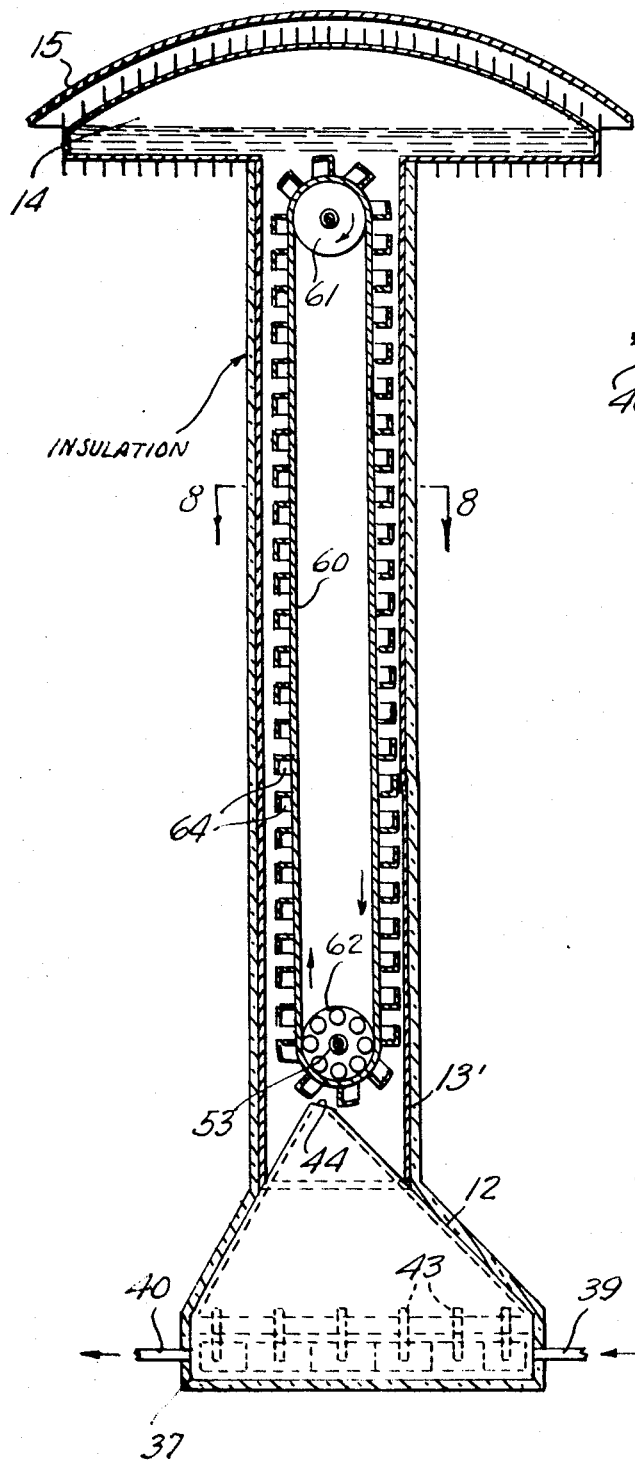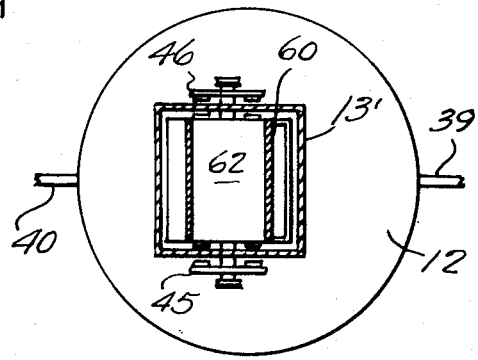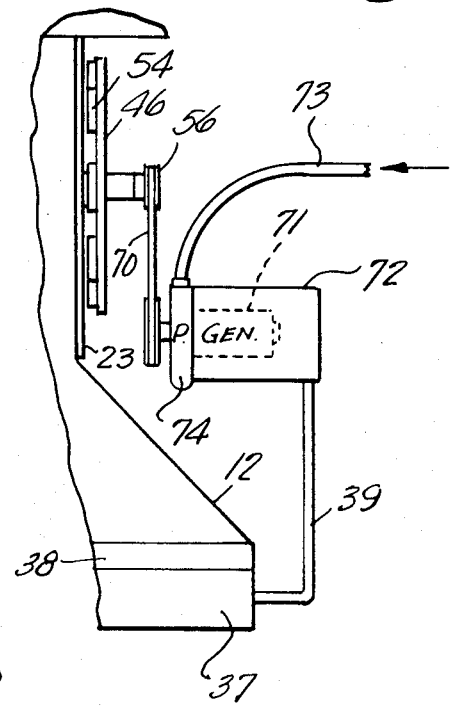

HEAT VAPOR DIFFERENTIAL ENGINE

This invention relates to heat engines, and more particularly to a heat engine of the type employing a liquid with a low boiling point as a working fluid and utilizing the vaporized liquid to generate mechanical power.

A main object of the invention is to provide a novel and improved heat engine which is simple in construction, which is very economical to operate, and which may be employed to generate mechanical energy from a natural heat source, such as from the sun, from hot springs, or the like, or from any other convenient heat source.

A further object of the invention is to provide an improved heat engine which is relatively compact in size, which is safe to operate, which requires a minimum amount of maintenance, and which utilizes natural sources of heat and efficiently converts such heat into useful mechanical energy.

Further objects and advantages of the invention will become apparent from the following description and claims, and from the accompanying drawings, wherein:

FIG. 1 is a perspective view of a typical embodiment of a heat engine according to the present invention.

FIG. 2 is a somewhat enlarged horizontal cross-sectional view taken substantially on the line 2—2 of FIG. 1.

FIG. 3 is an enlarged vertical cross-sectional view taken substantially on the line 3—3 of FIG. 1.

FIG. 4 is an enlarged vertical cross-sectional view taken substantially on the line 4—4 of FIG. 1.

FIG. 5 is a vertical cross-sectional view taken substantially on the line 5—5 of FIG. 4.

FIG. 6 is a vertical cross-sectional view taken substantially on line 6—6 of FIG. 4.

FIG. 7 is a vertical cross-sectional view taken through a modified form of heat engine according to the present invention employing a vertical turbine belt assembly.

FIG. 8 is a horizontal cross-sectional view taken substantially on the line 8—8 of FIG. 7.

FIG. 9 is a fragmentary elevational view taken substantially on the line 8—8 of FIG. 7.

FIG. 9 is a fragmentary elevational view of another modified form of heat engine according to the present invention and illustrating how otherwise wasted heat from an associated electrical generator may be returned to the system to improve its economy.

Referring to the drawings, and more particularly to FIGS. 1 to 6, 11 generally designates an improved heat engine constructed in accordance with the present invention. The engine 11 comprises an upstanding insulated container having the enlarged generally conical base portion 12, the vertically extending main body portion 13 of generally oval cross-sectional shape, as shown in FIG. 2, and the generally circular, mushroom-shaped top end portion 14 over which is mounted a downwardly curved, generally spherically shaped cover 15 which is spaced upwardly a short distance from the correspondingly generally spherically shaped, upwardly convex top wall 16 of the top chamber 14.

As will be presently explained, the top chamber 14 is employed as a condenser and is provided with outwardly projecting heat-dissipating flanges or vanes 18, both on its top wall and on its bottom wall portions. The top wall 16 is provided with an upwardly projecting conduit 19 having a valve 20 which normally is closed so that the interior of the container is normally hermetically vapor vacuum sealed.

The upstanding intermediate portion 13 has opposing substantially parallel vertical wall portions 21, 21 which are formed with respective large circular openings. Sealingly secured to the walls 21, 21 at the margins of said openings and covering same are respective disc members 22 and 23, said disc members being secured to the walls 21 by means of fastening bolts 24. Suitable gaskets may be employed between disc members 22, 23 and the marginal portions of the circular openings to provide the necessary seals.

The disc member 22 and 23 are centrally formed with outwardly projecting integral hollow boss or cup elements 25 and 26 in which are journaled the respective aligned bearing studs 27 and 28 of a hollow drum member 29 disposed in the container portion 13 between the cover discs 22 and 23. As shown in FIG. 4, suitable spacer collars 30 and 31 may be employed on the stud shaft elements 27 and 28 between the opposite disc members 51 and 52 which are part of drum 29 and the respective cover discs 22 and 23.

The periphery of the drum 29 is formed with uniformly spaced arcuately curved longitudinally extending vanes 33 defining successive turbine cups 34 acting as receptacles to receive vapor bubbles 35, as will be presently described, the bubbles moving upwardly and acting to rotate the drum 29 in a clockwise direction, as viewed in FIG. 3. Thus, the vanes 33 are oriented to receive such bubbles 35 at the left side of drum 29, as viewed in FIG. 3, and to release the bubbles for continued upward flow after they reach the top portion of the drum.

As will be readily apparent, the buoyant force of the upwardly moving bubbles is transferred to the drum, causing it to rotate clockwise, as viewed in FIG. 3.

The working fluid, shown at 36 comprises a suitable liquid, preferably of a non-corrosive nature, having a relatively low boiling point and being relatively inflammable. For example, in a typical embodiment of the invention, the working fluid was methylene chloride which is substantially non-inflammable and which has a boiling point of 104°F and a melting point of minus 143°F.

The lower portion of the container is provided with a heat exchange chamber 37 which is of generally circular shape and which is substantially the same size as the bottom end of container portion 12, being supported thereon and being separated therefrom by a layer of heat insulating material 38. The heat transfer circuit, which includes a suitable heat input source, such as a solar heat collector, has a supply conduit 39 connected to chamber 37 at the right side thereof, as viewed in FIG. 3, and has a discharge conduit 40 connected to the chamber 37 diametrically opposite conduit 39, namely, at the left side thereof, as viewed in FIG. 3. Thus, the input source may comprise a liquid reservoir heated by solar radiation, or by any other suitable primary heat source, depending on the climate, the heated liquid therefrom being conducted to the heat exchange chamber 37 through the conduit 39 and the cooled liquid passing from chamber 37 back to the heat input reservoir through the conduit 40.

Mounted in the heat exchange chamber 37 is a heat receiver 41 comprising a large number of individual cells 42 provided with vertical conduits 43 extending upwardly from the cells through the top wall of chamber 37, the layer of insulating material 38 and the bottom wall of the main container, as shown in FIG. 3, whereby each cell 42 is in communication with the lower portion 12 of the main container. As previously mentioned, said lower portion is of generally conical shape, being somewhat eccentric so that its apex is located off center, namely, left-wards of the vertical center line of the main container, as viewed in FIG. 3. The top end of the generally conical portion 12 is elongated in a direction parallel to the axis of drum 29 and is provided with the correspondingly elongated nozzle opening 44 located adjacent to and extending substantially parallel to the turbine cup members 34, the opening 44 being substantially co-extensive with the bubble-receiving opening of each of said turbine cup members 34 as is illustrated in FIG. 3. Therefore, bubbles generated in the cells 42 due to heat input from the warm liquid supplied to chamber 37 rise through the vertical discharge orifice tubes 43 and rise vertically in the conical chamber 12, eventually emerging from the opening 44 into the cup members 34, the upward buoyancy of the bubbles acting on the cup members to produce the clockwise rotation of drum 29 above described.

As above mentioned, after the bubbles pass upwardly from the turbine rotor, they reach the upper condenser chamber 14 where they are cooled and are converted to a liquid state.

Journaled on the outwardly extending axially aligned opposite cup members 25 and 26 of the cover plates 22 and 23 are respective outer disc members 45 and 46, said disc members being formed with respective hollow hub portions 47 and 48 receiving the members 25 and 26, with suitable spacer cups 49 and 50 provided between hub elements 25 and 47 and hub elements 26 and 48, as shown in FIG. 4.

The disc members 45 and 46 are magnetically coupled respectively to the end disc members 51 and 52 of drum 29 by the provision of inner coupling magnets 53 on the disc members 51 and 52 which are magnetically attracted to oppositely poled corresponding magnets 54 provided on the disc members 45 and 46, the intervening cover discs 22 and 23 being made of non-magnetic material so as not to interfere with the magnetic coupling between the adjacent oppositely poled pairs of magnets 53 and 54. Thus, the magnets 53 may have North poles facing the adjacent cover discs and the magnets 54 adjacent thereto may have South poles directed toward the associated inner coupling magnets 53. This arrangement allows the main container to be hermetically sealed while at the same time allowing torque to be transmitted from the turbine drum 29 to the external disc or flywheel elements 45, 46.

The opposite hub elements 47 and 48 are provided with threaded studs 55 on which suitable output pulleys 56 may be secured, as shown in FIG. 4.

In operation, warm liquid supplied to the heat exchange chamber 37 flows past the chamber 41, transferring heat thereto and causing the liquid 36 and vapor in the cells 42 to generate bubbles which pass upwardly through tubes 43 and the conical portion 12, emerging at the opening 44 and being entrapped in the turbine cups 34, the buoyancy of the bubbles causing the turbine drum 29 to rotate in a clockwise direction, as viewed in FIG. 3. The bubbles eventually escape from the upper portion of the turbine after it has rotated and emerge into the space in the condenser chamber 14 to be converted to a liquid state by the cooling action therein, as above described. The cooled liquid leaves the chamber 37 through the conduit 40, returning to the reservoir where it is reheated by solar rays, or by other heat supply means to eventually be recirculated back to the heat engine 11.

In the embodiment illustrated in FIGS. 7 and 8, the intermediate portion of the main container, shown at 13', has a generally rectangular horizontal cross-sectional shape, and instead of employing a turbine drum therein, an endless turbine belt 60 is employed. The turbine belt 60 is vertically supported on top and bottom rollers 61 and 62 journaled respectively in the top and bottom portions of intermediate chamber 13', the lower roller 62 being provided with the coupling magnets 53 on its opposite end faces, similar to those employed on the end discs 51 and 52 of the previously described turbine drum 29. The flexible belt 60 is provided with the turbine cups 64 which are arranged to receive the bubbles 35 from the top nozzle opening 44 of lower chamber 12 and to drive the belt in a clockwise direction, as viewed in FIG. 7. When the bubbles 35 reach the top condenser chamber 14, they are reconverted to their original liquid state in the manner previously described. Output torque is transmitted from the end faces of the lower roller 62 by magnetic coupling to external driven discs 45 and 46, shown in FIG. 8, in the same manner as previously described.

FIG. 9 illustrates a further embodiment applicable to either of the forms of the invention previously described, for utilizing heat generated by associated load equipment so as to increase the economy of operation of the engine. For example, the output pulley 56 may be coupled by a belt 70 to a conventional electrical generator 71. The generator 71 is encased in a jacket 72 contained in the heat transfer fluid circuit, so that heat produced by the generator 71 will be transferred to the heating liquid entering the conduit 39 and supplied to the heat exchange chamber 37. Thus, liquid from the main reservoir, receiving solar heat, or other heat input, passes through a conduit 73 to the inlet of a pump 74 mounted with its rotor connected to the generator shaft so as to be driven by the belt 70, the outlet of the pump 74 communicating with the interior of the jacket 72. The liquid from the conduit 73 is thus pumped through the jacket 72, cooling the generator 71 and acquiring heat therefrom which is utilized in the heat exchange chamber 37 to aid in generating the bubbles 35 in the working fluid 36 in the manner previously described. By thus utilizing the heat developed by the generator 71, in many circumstances the overall economy of the system may be substantially improved.

In the various forms of the invention above described, it will be noted that the external driven shaft means connected to, for example, the outer disc member element 45 carrying the hub element 47 is magnetically coupled to the turbine assembly, for example, by the cooperating mutually attracting sets of magnets 54 and 53. The magnetic attraction between said sets of magnets is very substantial and it is therefore not necessary to employ any additional fastenings to secure the hub element 47 on its supporting boss 25.

It is further to be noted that the vapor-condensing chamber 14 is greatly horizontally enlarged relative to the remainder of the main container and the upper portion of the container is therefor substantially mushroom-shaped. The enlargement of the vapor-condensing chamber is advantageous since it provides a much larger cooling area than would be otherwise obtained.

As above mentioned, any suitable working fluid having a relatively low boiling point may be employed as the working fluid in the various forms of heat engine above described. Preferably a working fluid having similar physical properties to methylene chloride is preferred, namely, one which is substantially non-inflammable and which has a boiling point of the order of 104°F and a melting point of minus 143°F.

By employing a hermetically vapor vacuum sealed container, as above described, it can be made free of all air and thereby only contain vapors of the working fluid employed. For example, in the case of methylene chloride employed as the working fluid, only a partial vacuum will be present and the liquid will boil at a temperature substantially below 104°F and give off vapor.

It should be understood that initially, namely, before the engine reaches its normal steady state operating condition, all foreign gases are removed, either by evacuating the top chamber portion of the container or by employing the boiling action of the liquid in cells 42 to force out the foreign gases and bring them to the top chamber 14 where they are expelled, along with some methylene chloride vapor, through the filler conduit 19, the valve 20 being open at this stage. The chloride vapor acts to drive out the air from the chamber 14, and when the chamber has been purged of the air and before stopping the boiling action, the valve 20 is closed. This leaves the container in a hermetically vapor vacuum sealed condition. In this condition, there is vapor in condenser 14 and also there is vapor in the cells 42. Between these two vapor locations there is a solid mass of liquid 36.

At this time in the condenser 14 and the cells 42 the vapor temperature is 104°F; the vapor pressure in the cells is the same as that of the outside atmosphere. When the vapor temperature is thereafter lowered from 104°F, the cells 42 and the condenser chamber 14 begin to develop partial vapor vacuums therein, and the partial vapor vacuums will continue to increase as the temperature drops. If the temperature could be brought down to minus 143°F, which is the melting point of methylene chloride, this would provide almost complete vacuum conditions in these spaces, with very little vapor.

If the temperatures in condenser chamber 14 and cells 42 are raised above 104°F, vapor pressures are developed in chamber 14 and cells 42. The following are some typical cases, wherein the liquid temperature is close to or the same as the vapor temperature and which illustrate some variations and possible operating conditions:

Case 1: Cells 42 have a vapor temperature of 104°F and condenser 14 has a vapor temperature of 84°F (20° less than cells 42). The vapor pressure in cells 42 is zero. There is a partial vapor vacuum in condenser chamber 14. This vacuum is enough to lift out vapor bubbles from cells 42. If the temperatures remain constant, the bubbles will flow continuously.

Case 2: The condenser 14, vapor temperature is 104°F and has zero vapor pressure, and the vapor temperature in cells 42 is 124°F, which will have a substantial vapor pressure. This vapor pressure will force vapor bubbles out into liquid 36. A differential of vapor pressures in cells 42 and chamber 14 will cause a flow of vapor bubbles.

Case 3: Condenser 14 has a vapor temperature of minus 60°F and the vapor temperature of cells 42 is minus 10°F. Because of the temperature differential, heat will be available from the material at minus 10°F to be delivered to the material at minus 60°F. Therefore, there is a sufficient differential between the partial vapor vacuum in chamber 14 and cells 42 to cause vapor bubbles to rise in the manner above described.

Water may be employed as the heat transfer medium in chamber 37 where the ambient temperature is always above 32°F. Under conditions where the temperature is below 32°F another suitable fluid of suitably low melting point can be used for supplying heat to the cells 42.

While certain embodiments of an improved heating engine have been disclosed in the foregoing description, it will be understood that various modifications with the spirit of the invention may occur to those skilled in the art. Therefore, it is intended that no limitations be placed on the invention except as defined by the scope of the appended claims.

What is claimed is:

1. A heat engine comprising a hermetically vapor vacuum sealed container, a quantity of liquid having a relatively low boiling point in said container, a turbine assembly mounted in said container and having a movable continuous peripheral portion provided with spaced turbine blade-like projections defining cup-like recesses therebetween, upwardly converging nozzle means in the container below said turbine assembly and having a discharge orifice at its top end located subjacent the cup-like recesses at one side of the turbine assembly, heating means in the lower portion of the container below said discharge orifice for forming bubbles of vapor in said liquid, whereby such bubbles rise and pass through said nozzle means and engage in said cup-like recesses and drive said turbine assembly, a vapor condensing chamber at the top end of the container, external driven shaft means, and means coupling said turbine assembly to said external driven shaft means.

2. The heat engine of claim 1, wherein said coupling means comprises cooperating respective internal and external permanent magnets on the turbine assembly and the external driven shaft means located and oriented to exert mutual magnetic attraction on each other.

3. The heat engine of claim 2, and wherein said heating means comprises a heat-receiving chamber in the lower portion of the container below said discharge orifice in communication therewith, and a heat-exchange jacket surrounding said heat-receiving chamber and provided with inlet and outlet conduits for conveying heating liquid through said jacket.

4. The heat engine of claim 3, and wherein said heat-receiving chamber comprises a plurality of compartments provided with bubble-conveying conduits extending upwardly therefrom and communicating with the space below said discharge orifice.

5. The heat engine of claim 4, and wherein the discharge orifice of said nozzle means is elongated and is substantially parallel to the cup-like recesses and is substantially coextensive in length with said recesses.

6. The heat engine of claim 5, and wherein said turbine blade-like projections are of arcuate cross-sectional shape.

7. The heat engine of claim 5, and wherein said container is provided with opposite side wall elements formed with aligned outwardly directed hollow bosses and said turbine assembly is provided with opposite stub shaft elements journaled in said hollow bosses.

8. The heat engine of claim 7, and wherein said driven shaft means is provided with a hollow hub element receiving and supportingly engaged on one of said hollow bosses.

9. The heat engine of claim 8, and wherein said opposite side wall elements are of non-magnetic material and the cooperating coupling permanent magnets are located at adjacent opposite surfaces of a side wall element, whereby the driven shaft means is retained on said one of said hollow bosses by magnetic attraction.

10. The heat engine of claim 5, and wherein said vapor-condensing chamber is horizontally enlarged relative to the remainder of the container and is substantially mushroom-shaped.

11. The heat engine of claim 5, and wherein the liquid in the container is methylene chloride.

12. The heat engine of claim 9, and wherein the cooperating coupling permanent magnets are arranged in coaxial circular patterns around the axis of the driven shaft means.

* * * * *